United States Patent
Guo et al.

(10) Patent No.: US 9,122,483 B2
(45) Date of Patent: Sep. 1, 2015

(54) ADAPTIVE VOLTAGE SCALING METHOD, CHIP, AND SYSTEM

(71) Applicant: Huawei Technologies Co., Ltd., Shenzhen (CN)

(72) Inventors: Jianping Guo, Shenzhen (CN); Xinru Wang, Shanghai (CN); Yiwei Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/192,238

(22) Filed: Feb. 27, 2014

(65) Prior Publication Data
US 2014/0240032 A1    Aug. 28, 2014

(30) Foreign Application Priority Data
Feb. 28, 2013    (CN) .......................... 2013 1 0066301

(51) Int. Cl.
G05F 1/26    (2006.01)
G06F 1/32    (2006.01)

(52) U.S. Cl.
CPC ............... *G06F 1/3296* (2013.01); *G05F 1/26* (2013.01)

(58) Field of Classification Search
CPC ........................................................ G05F 1/26
USPC ........................................................ 327/540
See application file for complete search history.

(56) References Cited

U.S. PATENT DOCUMENTS

| | | | | |
|---|---|---|---|---|
| 7,793,119 B2* | 9/2010 | Gammie et al. | .............. | 713/300 |
| 8,063,655 B2* | 11/2011 | Puchner et al. | .......... | 324/762.09 |
| 8,493,088 B2* | 7/2013 | von Kaenel | .................... | 326/16 |
| 8,648,645 B2* | 2/2014 | Konstadinidis et al. | ...... | 327/534 |
| 8,661,274 B2* | 2/2014 | Hansquine et al. | ........... | 713/310 |
| 8,698,552 B2* | 4/2014 | Priel et al. | ..................... | 327/540 |
| 8,860,708 B2* | 10/2014 | Routley et al. | ................ | 345/212 |
| 2009/0085652 A1* | 4/2009 | Wiatr et al. | .................... | 327/540 |
| 2011/0101990 A1* | 5/2011 | Noorlag et al. | ................ | 324/537 |
| 2011/0128030 A1* | 6/2011 | Wuidart | ................... | 324/762.01 |
| 2012/0169704 A1* | 7/2012 | Chung | .......................... | 345/212 |
| 2012/0235702 A1* | 9/2012 | Huang et al. | ............. | 324/762.01 |
| 2013/0033948 A1* | 2/2013 | Braceras et al. | .............. | 365/201 |
| 2013/0047166 A1* | 2/2013 | Penzes et al. | ................. | 718/105 |
| 2013/0117582 A1* | 5/2013 | Satyamoorthy et al. | ...... | 713/300 |
| 2013/0154723 A1* | 6/2013 | Ko et al. | ........................ | 327/540 |
| 2013/0201173 A1* | 8/2013 | Chaji et al. | .................... | 345/212 |
| 2013/0305068 A1* | 11/2013 | Jung | ............................ | 713/322 |
| 2013/0311799 A1* | 11/2013 | Fitzpatrick et al. | ........... | 713/320 |
| 2014/0095140 A1* | 4/2014 | Weir et al. | ....................... | 703/14 |
| 2014/0123085 A1* | 5/2014 | Shroff et al. | ................... | 716/102 |
| 2014/0223205 A1* | 8/2014 | Muthukaruppan et al. | ... | 713/320 |

* cited by examiner

*Primary Examiner* — Thomas J Hiltunen
(74) *Attorney, Agent, or Firm* — Slater & Matsil, L.L.P.

(57) ABSTRACT

Embodiments of the present invention provide an adaptive voltage scaling method, chip, and device. An aging effect-related state parameter in a chip is obtained at a first voltage adjustment time point. The first voltage adjustment time point is one of multiple voltage adjustment time points set for the chip. An aging compensation voltage corresponding to the first voltage adjustment time point is determined according to the state parameter. A minimum operating voltage of the chip is compensated for according to the aging compensation voltage, so as to adjust an operating voltage of the chip.

22 Claims, 6 Drawing Sheets

ADAPTIVE VOLTAGE SCALING METHOD, CHIP, AND SYSTEM

CROSS-REFERENCE TO RELATED APPLICATIONS

This application claims priority to Chinese Patent Application No. 201310066301.X, filed on Feb. 28, 2013, which is hereby incorporated by reference in its entirety.

TECHNICAL FIELD

Embodiments of the present invention relate to chip technologies, and in particular to an adaptive voltage scaling method, chip, and system.

BACKGROUND

As the level of integration of mobile devices and chips becomes higher and higher, energy consumption and a continued use period are becoming a focus of people's attention. However, battery technologies that relatively lag behind impose higher and higher requirements of low power consumption on a mobile device.

In the prior art, an adaptive voltage scaling (Adaptive Voltage Scaling, AVS for short) technology is used to determine a minimum operating voltage of a chip and adjust a supply voltage for the chip according to the minimum operating voltage, so as to reduce power consumption of the chip. However, after the chip, whose power is supplied by using the minimum operating voltage as the supply voltage at an initial state, is in operation for a period, a threshold voltage of a transistor in the chip increases, resulting in that the minimum operating voltage of the chip increases. If the chip still operates at the minimum operating voltage at the initial state, a chip failure will occur. As a result, in the prior art, in consideration of chip aging, an aging voltage increment of the chip in an entire life cycle is obtained by an aging experiment and statistics analysis, and a sum of the minimum operating voltage and the aging voltage increment is used to adjust the supply voltage of the chip, so as to avoid the case of a chip failure.

However, the adjustment in the supply voltage of the chip by using the prior art causes the chip to operate by using the supply voltage as an operating voltage, which frequently results in problems of aging acceleration and power consumption increase for the chip.

SUMMARY

The present invention provides an adaptive voltage scaling method, chip, and system to solve the problems of aging acceleration and power consumption increase for the chip by compensating for a minimum operating voltage of a chip multiple times in a life cycle of the chip, and then adjusting an operating voltage of the chip according to the minimum operating voltage after compensation.

In a first aspect, an embodiment of the present invention provides an adaptive voltage scaling method, including: obtaining an aging effect-related state parameter in a chip at a first voltage adjustment time point, where the first voltage adjustment time point is one of multiple voltage adjustment time points set for the chip; determining an aging compensation voltage corresponding to the first voltage adjustment time point according to the state parameter; and compensating for a minimum operating voltage of the chip according to the aging compensation voltage, so as to adjust an operating voltage of the chip.

In a first possible implementation of the first aspect, before the obtaining the aging effect-related state parameter in the chip at the first voltage adjustment time point, the method further includes: dividing the multiple voltage adjustment time points according to a life cycle of the chip.

With reference to the first possible implementation of the first aspect, in a second possible implementation of the first aspect, the dividing the multiple voltage adjustment time points according to the life cycle of the chip includes: dividing the multiple voltage adjustment time points by using a decreasing time interval between every two neighboring voltage adjustment time points; or dividing the multiple voltage adjustment time points by using an equal interval; or dividing the multiple voltage adjustment time points according to a slope of an aging effect curve of the chip.

With reference to the first aspect, the first possible implementation of the first aspect, or the second possible implementation of the first aspect, in a third possible implementation of the first aspect, the state parameter includes an operating voltage and an operating temperature.

With reference to the third possible implementation of the first aspect, in a fourth possible implementation of the first aspect, the determining the aging compensation voltage corresponding to the first voltage adjustment time point according to the state parameter includes: querying a storage medium according to the state parameter to obtain the aging compensation voltage corresponding to the first voltage adjustment time point, where the storage medium stores a mapping relationship, which is obtained by aging simulation, between the multiple voltage adjustment time points and a respective state parameter and aging compensation voltage at each voltage adjustment time point; or obtaining the aging compensation voltage by performing aging calculation according to the state parameter.

With reference to the fourth possible implementation of the first aspect, in a fifth possible implementation of the first aspect, the mapping relationship, which is obtained by aging simulation, between the multiple voltage adjustment time points and the respective state parameter and aging compensation voltage at each voltage adjustment time point is determined in the following mode: at a time point $t_i$ and according to different operating voltages and operating temperatures of the chip, obtaining a saturation current degradation percentage of the chip within a time segment from the time point $t_i$ to $t_{i+1}$ corresponding to each operating voltage and operating temperature; and modifying the operating voltage at the time point $t_i$ according to the saturation current degradation percentage, so as to obtain an aging compensation voltage at the time point $t_{i+1}$ corresponding to each operating voltage and operating temperature; where i is an integer greater than or equal to 0; the number of time points is greater than or equal to the number of voltage adjustment time points; the operating voltage of the chip at the time point $t_i$ is a sum of an operating voltage of the chip at a time point $t_{i-1}$ and an aging compensation voltage at the time point $t_i$ corresponding to the operating voltage and operating temperature of the chip at the time point $t_{i-1}$.

With reference to the fifth possible implementation of the first aspect, in a sixth possible implementation of the first aspect, the obtaining the saturation current degradation percentage of the chip within the time segment from the time point $t_i$ to $t_{i+1}$ corresponding to each operating voltage and operating temperature includes: obtaining a drain-source voltage and a gate-source voltage of each MOS transistor of the chip within a simulation duration $\Delta t$ after $t_i$; according to the operating temperature at $t_i$, the drain-source voltage, and a saturation current degradation model of the MOS transistor caused by hot carrier injection HCI, obtaining a first saturation current degradation percentage of each MOS transistor within the time segment from $t_i$ to $t_{i+1}$ caused by the HCI; according to the operating temperature at $t_i$, the gate-source voltage, and a saturation current degradation model of the MOS transistor caused by bias temperature instability BTI, obtaining a second saturation current degradation percentage of each MOS transistor within the time segment from $t_i$ to $t_{i+1}$ caused by the BTI; and determining a sum of the first saturation current degradation percentage and the second saturation current degradation percentage of each MOS transistor within the time segment from $t_i$ to $t_{i+1}$ as the saturation current degradation percentage of each MOS transistor within the time segment from $t_i$ to $t_{i+1}$; and the modifying the operating voltage at the time point $t_i$ according to the saturation current degradation percentage, so as to obtain the aging compensation voltage at the time point $t_{i+1}$ corresponding to each operating voltage and operating temperature includes: obtaining a first output frequency of the chip within the simulation duration $\Delta t$ after $t_i$; obtaining a post-aging physical parameter of the chip at $t_{i+1}$ according to the saturation current degradation percentage of each MOS transistor within the time segment from $t_i$ to $t_{i+1}$; performing simulation aging processing on the chip by using the post-aging physical parameter; enabling the post-aging chip to operate at the operating temperature at $t_i$ within the simulation duration $\Delta t$, and obtaining a second output frequency of the post-aging chip within the simulation duration $\Delta t$; and when the second output frequency equals the first output frequency, obtaining the operating voltage of the post-aging chip, and determining a difference between the operating voltage of the post-aging chip and the operating voltage at $t_i$ as the aging compensation voltage at $t_{i+1}$.

With reference to the first aspect, the first possible implementation of the first aspect, the second possible implementation of the first aspect, the third possible implementation of the first aspect, the fourth possible implementation of the first aspect, the fifth possible implementation of the first aspect, or the sixth possible implementation of the first aspect, in a seventh possible implementation of the first aspect, the compensating for the minimum operating voltage of the chip according to the aging compensation voltage, so as to adjust the operating voltage of the chip includes: sending a voltage adjustment request to a power manager integrated circuit PMIC, where the voltage adjustment request includes the aging compensation voltage, so that the PMIC adjusts the operating voltage of the chip according to a voltage sum of the supply voltage currently supplied to the chip and the aging compensation voltage; or sending a voltage adjustment request to the PMIC, where the voltage adjustment request includes a voltage sum of the voltage currently supplied to the chip and the aging compensation voltage, so that the PMIC adjusts the operating voltage of the chip according to the voltage sum.

In a second aspect, an embodiment of the present invention provides an adaptive voltage scaling chip, including: an obtaining module, configured to obtain an aging effect-related state parameter in a chip at a first voltage adjustment time point, where the first voltage adjustment time point is one of multiple voltage adjustment time points set for the chip; a determining module, configured to determine an aging compensation voltage corresponding to the first voltage adjustment time point according to the state parameter; and a processing module, configured to compensate for a minimum operating voltage of the chip according to the aging compensation voltage, so as to adjust an operating voltage of the chip.

In a first possible implementation of the second aspect, the adaptive voltage scaling chip further includes a dividing module, configured to divide, before the obtaining module obtains the aging effect-related state parameter in the chip, the multiple voltage adjustment time points according to a life cycle of the chip.

With reference to the first possible implementation of the second aspect, in a second possible implementation of the second aspect, the dividing module is specifically configured to divide the multiple voltage adjustment time points by using a decreasing time interval between every two neighboring voltage adjustment time points; or divide the multiple voltage adjustment time points by using an equal interval; or divide the multiple voltage adjustment time points according to a slope of an aging effect curve of the chip.

With reference to the second aspect, the first possible implementation of the second aspect, or the second possible implementation of the second aspect, in a third possible implementation of the second aspect, the state parameter includes an operating voltage and an operating temperature.

With reference to the third possible implementation of the second aspect, in a fourth possible implementation of the second aspect, the determining module is specifically configured to query a storage medium according to the state parameter to obtain the aging compensation voltage corresponding to the first voltage adjustment time point, where the storage medium stores a mapping relationship, which is obtained by aging simulation, between the multiple voltage adjustment time points and a respective state parameter and aging compensation voltage at each voltage adjustment time point; or obtain the aging compensation voltage by performing aging calculation according to the state parameter.

With reference to the fourth possible implementation of the second aspect, in a fifth possible implementation of the second aspect, the mapping relationship, which is obtained by aging simulation, between the multiple voltage adjustment time points and the respective state parameter and aging compensation voltage at each voltage adjustment time point is determined in the following mode: at a time point $t_i$ and according to different operating voltages and operating temperatures of the chip, obtaining a saturation current degradation percentage of the chip within a time segment from the time point $t_i$ to $t_{i+1}$ corresponding to each operating voltage and operating temperature; and modifying the operating voltage at the time point $t_i$ according to the saturation current degradation percentage, so as to obtain an aging compensation voltage at the time point $t_{i+1}$ corresponding to each operating voltage and operating temperature; where i is an integer greater than or equal to 0; the number of time points is greater than or equal to the number of voltage adjustment time points; the operating voltage of the chip at the time point $t_i$ is a sum of an operating voltage of the chip at a time point $t_{i-1}$ and an aging compensation voltage at the time point $t_{i-1}$ corresponding to the operating voltage and operating temperature of the chip at the time point $t_i$.

With reference to the fifth possible implementation of the second aspect, in a sixth possible implementation of the second aspect, the obtaining the saturation current degradation percentage of the chip within the time segment from the time point $t_i$ to $t_{i+1}$ corresponding to each operating voltage and operating temperature includes: obtaining a drain-source voltage and a gate-source voltage of each MOS transistor of the chip within a simulation duration $\Delta t$ after $t_i$; according to the operating temperature at $t_i$, the drain-source voltage, and a saturation current degradation model of the MOS transistor caused by hot carrier injection HCI, obtaining a first saturation current degradation percentage of each MOS transistor within the time segment from $t_i$ to $t_{i+1}$ caused by the HCI; according to the operating temperature and the gate-source voltage at $t_i$, and a saturation current degradation model of the MOS transistor caused by bias temperature instability BTI, obtaining a second saturation current degradation percentage of each MOS transistor within the time segment from $t_i$ to $t_{i+1}$ caused by the BTI; and determining a sum of the first saturation current degradation percentage and the second saturation current degradation percentage of each MOS transistor within the time segment from $t_i$ to $t_{i+1}$ as the saturation current degradation percentage of each MOS transistor within the time segment from $t_i$ to $t_{i+1}$; and the modifying the operating voltage at the time point $t_i$ according to the saturation current degradation percentage, so as to obtain the aging compensation voltage at the time point $t_{i+1}$ corresponding to each operating voltage and operating temperature includes: obtaining a first output frequency of the chip within the simulation duration $\Delta t$ after $t_i$; obtaining a post-aging physical parameter of the chip at $t_i$ according to the saturation current degradation percentage of each MOS transistor within the time segment from $t_{i+1}$ to $t_{i+1}$; performing simulation aging processing on the chip by using the post-aging physical parameter; enabling the post-aging chip to operate at the operating temperature at $t_i$ within the simulation duration $\Delta t$, and obtaining a second output frequency of the post-aging chip within the simulation duration $\Delta t$; and when the second output frequency equals the first output frequency, obtaining the operating voltage of the post-aging chip, and determining a difference between the operating voltage of the post-aging chip and the operating voltage at $t_i$ as the aging compensation voltage at $t_{i+1}$.

With reference to the second aspect, the first possible implementation of the second aspect, the second possible implementation of the second aspect, the third possible implementation of the second aspect, the fourth possible implementation of the second aspect, the fifth possible implementation of the second aspect, or the sixth possible implementation of the second aspect, in a seventh possible implementation of the second aspect, the processing module is specifically configured to send a voltage adjustment request to a power manager integrated circuit PMIC, where the voltage adjustment request includes the aging compensation voltage, so that the PMIC adjusts the operating voltage of the chip according to a voltage sum of the supply voltage currently supplied to the chip and the aging compensation voltage; or send a voltage adjustment request to the PMIC, where the voltage adjustment request includes a voltage sum of the current operating voltage of the chip and the aging compensation voltage, so that the PMIC adjusts the operating voltage of the chip according to the voltage sum.

In a third aspect, an embodiment of the present invention provides an adaptive voltage scaling system, including an adaptive voltage scaling chip and a power manager integrated circuit, where the adaptive voltage scaling chip includes the chip described above.

In the adaptive voltage scaling method, chip, and system according to the embodiments of the present invention, the aging effect-related state parameter in the chip is obtained at the first voltage adjustment time point, where the first voltage adjustment time point is one of multiple voltage adjustment time points set for the chip; the aging compensation voltage corresponding to the first voltage adjustment time point is obtained according to the state parameter; and the minimum operating voltage of the chip is compensated for according to the aging compensation voltage, so as to adjust the operating voltage of the chip. Because multiple voltage adjustment time points are set for the chip, the minimum operating voltage of the chip is compensated for multiple times within the life cycle of the chip, and the operating voltage of the chip is adjusted according to the minimum operating voltage after compensation, so that the problems of aging acceleration and power consumption increase are solved for the chip.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
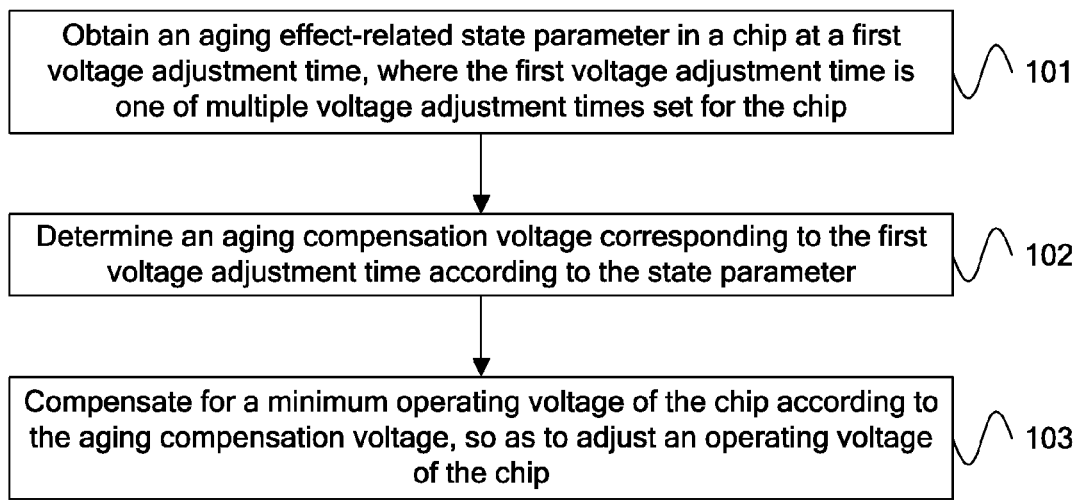
FIG. 1 is a flowchart of an adaptive voltage scaling method according to a first embodiment of the present invention.

FIG. 1 is a flowchart of an adaptive voltage scaling method according to a first embodiment of the present invention. As shown in FIG. 1, the method according to the embodiment may include:

Step 101: Obtain an aging effect-related state parameter in a chip at a first voltage adjustment time point, where the first voltage adjustment time point is one of multiple voltage adjustment time points set for the chip.

In the embodiment, after the chip is in operation for a while, a phenomenon of saturation current degradation and threshold voltage increase exists on a metal oxide semiconductor field-effect transistor (Metal Oxide Semiconductor, MOS transistor for short) in the chip due to aging, resulting in that a minimum operating voltage of the chip increases. As a result, a voltage of the chip needs to be adjusted during an operation period. Multiple voltage adjustment time points may be set in advance within a life cycle of the chip, or multiple voltage adjustment time points may be set, within the life cycle of the chip, according to compensation requirements of the minimum operating voltage of the chip; and then an aging compensation voltage is set corresponding to each voltage adjustment time point, so as to compensate for the minimum operating voltage of the chip at the voltage adjustment time point. Therefore, when the first voltage adjustment time point is reached, the aging effect-related state parameter of the chip at the first voltage adjustment time point is obtained, where the aging effect-related state parameter in the chip may be an operating voltage and/or an operating temperature and/or an operating current, and the like, and the embodiment sets no limit thereto; and the first voltage adjustment time point may be any one voltage adjustment time point in the multiple voltage adjustment time points set for the chip.

Step 102: Determine an aging compensation voltage corresponding to the first voltage adjustment time point according to the state parameter.

In the embodiment, after the aging effect-related state parameter of the chip at the first voltage adjustment time point is obtained, the aging compensation voltage corresponding to the first voltage adjustment time point is determined according to the state parameter. It should be noted that the first voltage adjustment time point corresponds to one aging compensation voltage. That is, each voltage adjustment time point corresponds to one aging compensation voltage.

Step 103: Compensate for the minimum operating voltage of the chip according to the aging compensation voltage, so as to adjust an operating voltage of the chip.

In the embodiment, after the aging compensation voltage corresponding to the first voltage adjustment time point is obtained, the minimum operating voltage of the chip is compensated for according to the aging compensation voltage, so as to adjust, according to the minimum operating voltage of the chip, a supply voltage of a power manager integrated circuit (Power Manager Integrated Circuit, PMIC for short) that supplies power to the chip, so that the operating voltage of the chip is the supply voltage supplied by the PMIC to the chip after the adjustment, thereby implementing adjustment on the operating voltage of the chip at the first voltage adjustment time point. This ensures that the operating voltage of the chip is not lower than the minimum operating voltage after compensation.

Perform step 101 to step 103 repeatedly, so that the chip can, at the multiple voltage adjustment time points set for the chip, determine an aging compensation voltage according to an aging effect-related state parameter at each voltage adjustment time point, and then compensate for the minimum operating voltage of the chip, so as to adjust the operating voltage of the chip to be not lower than the minimum operating voltage, thereby compensating for the minimum operating voltage of the chip multiple times within the life circle of the chip, and adjusting the operating voltage of the chip.

In the adaptive voltage scaling method according to the first embodiment of the present invention, the aging effect-related state parameter in the chip is obtained at the first voltage adjustment time point, where the first voltage adjustment time point is one of multiple voltage adjustment time points set for the chip; the aging compensation voltage corresponding to the first voltage adjustment time point is obtained according to the state parameter; and the minimum operating voltage of the chip is compensated for according to the aging compensation voltage, so as to adjust the operating voltage of the chip. Because multiple voltage adjustment time points are set for the chip, the minimum operating voltage of the chip is compensated for multiple time points within the life cycle of the chip, and the operating voltage of the chip is adjusted according to the minimum operating voltage after compensation, so that the problems of aging acceleration and power consumption increase are solved for the chip.

Figure 2:
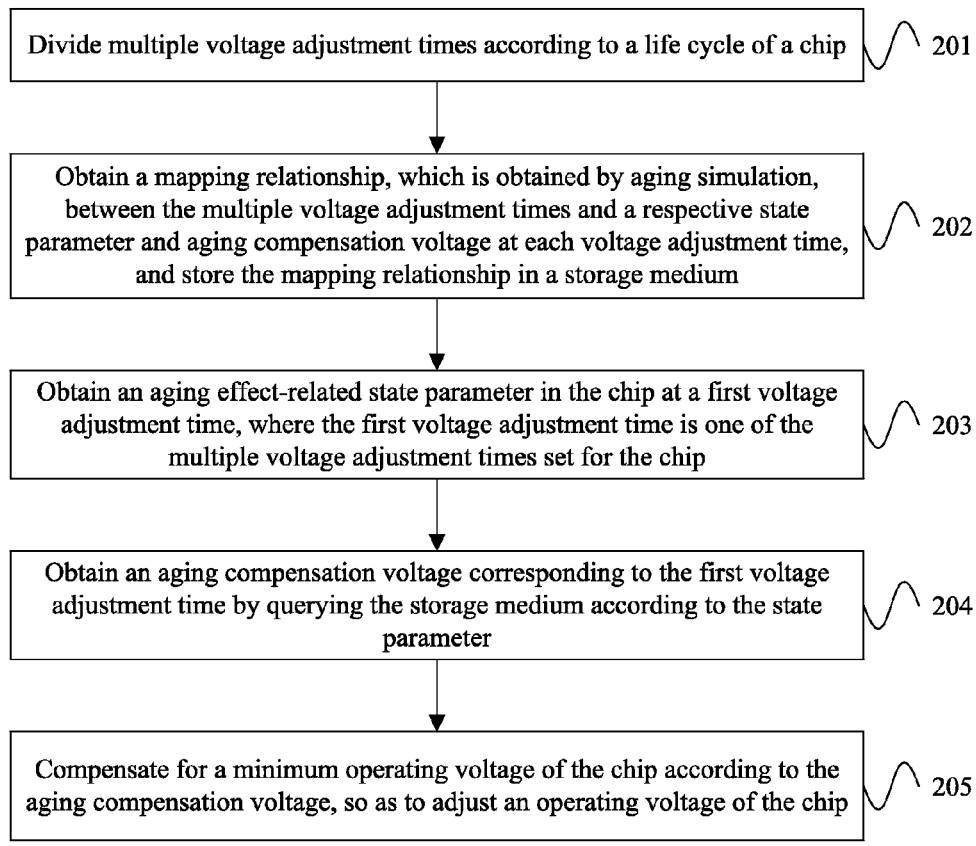
FIG. 2 is a flowchart of an adaptive voltage scaling method according to a second embodiment of the present invention.

FIG. 2 is a flowchart of an adaptive voltage scaling method according to a second embodiment of the present invention. As shown in FIG. 2, the method according to the embodiment may include:

Step 201: Divide multiple voltage adjustment time points according to a life cycle of a chip.

In the embodiment, the dividing of the multiple voltage adjustment time points according to the life cycle of the chip may include: dividing the multiple voltage adjustment time points by using a decreasing time interval between every two neighboring voltage adjustment time points. The dividing may alternatively include dividing the multiple voltage adjustment time points by using an equal interval, or dividing the multiple voltage adjustment time points according to a slope of an aging effect curve of the chip, where the aging effect curve may be obtained by performing numerous experiments, and the present invention is not limited thereto.

It should be noted that in the embodiment, the multiple voltage adjustment time points of the chip may be divided by using the three modes described above. However, the embodiment is not limited thereto.

Step 202: Obtain a mapping relationship, which is obtained by aging simulation, between the multiple voltage adjustment time points and a respective state parameter and aging compensation voltage at each voltage adjustment time point, and store the mapping relationship in a storage medium.

In the embodiment, the mapping relationship, which is obtained by aging simulation, between the multiple voltage adjustment time points and the respective state parameter and aging compensation voltage at each voltage adjustment time point is obtained, and the minimum operating voltage of the chip is compensated for according to the aging compensation voltage corresponding to the voltage adjustment time point in the mapping relationship. In order to improve accuracy for compensating for the minimum operating voltage of the chip, the mapping relationship includes a mapping relationship between each voltage adjustment time point and the aging effect-related state parameter of the chip and the aging compensation voltage, so as to determine the aging compensation voltage according to the current state parameter of the chip and the mapping relationship, thereby compensating for the minimum operating voltage of the chip to adjust the operating voltage of the chip. Meanwhile, the obtained mapping relationship is stored in the storage medium. The storage medium may be a non-volatile memory, but the embodiment is not limited thereto. This avoids loss of the mapping relationship. The non-volatile memory may be a memory set in the chip, or a memory set outside the chip. The state parameter in the mapping relationship may be the operating voltage and/or the operating temperature of the chip. Preferably, the state parameter may be the operating voltage and the operating temperature of the chip, so as to further improve accuracy for adjusting the operating voltage of the chip.

It should be noted that step 202 may also be performed before step 201, and the embodiment sets no limit thereto.

Step 203: Obtain an aging effect-related state parameter in a chip at a first voltage adjustment time point, where the first voltage adjustment time point is one of the multiple voltage adjustment time points set for the chip.

In the embodiment, after the chip obtains the mapping relationship described above and when the chip starts operation, an operation time of the chip needs to be recorded. Specifically, a counter may be set in the chip, where the counter records the operation time of the chip, and the counter also stores the recorded operation time of the chip to the storage medium, where the storage medium may be a non-volatile memory, so as to avoid loss of the recorded operation time of the chip when the chip is powered off. This can improve the accuracy for compensating for the minimum operating voltage of the chip, so as to effectively adjust the operating voltage of the chip.

Because the mapping relationship records the voltage adjustment time points, when the counter records an operation time of the chip which is each voltage adjustment time point, indicating that the first voltage adjustment time point is reached, the minimum operating voltage of the chip needs to be compensated for. In such cases, the operating voltage and/or operating temperature of the chip shall be obtained. When the state parameter in the mapping relationship is the operating voltage and if the chip operates in a constant temperature mode, only the operating voltage of the chip needs to be obtained when the first voltage adjustment time point is reached. When the state parameter in the mapping relationship is the operating temperature and if the chip operates in a constant voltage mode, only the operating temperature needs to be obtained when the first voltage adjustment time point is reached. Preferably, when the state parameter in the mapping relationship is the operating voltage and the operating temperature, the operating voltage and the operating temperature of the chip need to be obtained when the first voltage adjustment time point is reached, so as to improve the accuracy for compensating for the minimum operating voltage of the chip.

A specific process of obtaining the operating voltage of the chip may be: obtaining the operating voltage of the chip detected and obtained by a detecting circuit, where the detecting circuit is mainly configured to detect the operating voltage of the chip; or obtaining the operating voltage of the chip detected and obtained by an AVS controller, where the AVS controller is capable of obtaining the operating voltage of the chip. It should be noted that the AVS controller obtains the operating voltage of the chip in the same manner as the prior art, which is not described in the embodiment of the present invention.

A specific process of the obtaining the operating temperature of the chip may be: obtaining the operating temperature of the chip sensed and obtained by a temperature-sensitive component on the chip, where the temperature-sensitive component is a device capable of sensing a temperature change; or obtaining an output frequency of an oscillator on the chip, and obtaining the operating temperature of the chip according to the output frequency. It should be noted that the output frequency of oscillation is related to the operating temperature of the chip. It should be noted that a relationship between the output frequency and the operating temperature of the chip is the same as the prior art, which is not described in the embodiment of the present invention.

Step 204: Obtain an aging compensation voltage corresponding to the first voltage adjustment time point by querying the storage medium according to the state parameter.

In the embodiment, the operating voltage and/or the operating temperature of the chip at the first voltage adjustment time point are obtained, and the aging compensation voltage corresponding to the first voltage adjustment time point is determined by querying the storage medium according to the operating voltage and/or the operating temperature of the chip, where the storage medium stores the mapping relationship, that is obtained by aging simulation, between the multiple voltage adjustment time points and the respective state parameter and aging compensation voltage at each voltage adjustment time point. When only the operating voltage of the chip is obtained, the mapping relationship stored in the storage medium (for example, a non-volatile memory) is queried according to the operating voltage of the chip to obtain the aging compensation voltage corresponding to the first voltage adjustment time point. That is, the aging compensation voltage corresponds to the first voltage adjustment time point and to the operating voltage of the chip. When only the operating temperature of the chip is obtained, the mapping relationship stored in the storage medium (for example, a non-volatile memory) is queried according to the operating temperature of the chip to obtain the aging compensation voltage corresponding to the first voltage adjustment time point. That is, the aging compensation voltage corresponds to the first voltage adjustment time point and to the operating temperature of the chip. Preferably, when the operating voltage and the operating temperature of the chip are obtained, the mapping relationship stored in the storage medium (for example, a non-volatile memory) is queried according to the operating voltage and the operating temperature of the chip to obtain the aging compensation voltage corresponding to the first voltage adjustment time point. That is, the aging compensation voltage corresponds to the first voltage adjustment time point and the operating voltage and operating temperature of the chip, so as to further improve the accuracy for compensating for the minimum operating voltage of the chip.

Step 205: Compensate for the minimum operating voltage of the chip according to the aging compensation voltage, so as to adjust the operating voltage of the chip.

In the embodiment, after the aging compensation voltage corresponding to the first voltage adjustment time point is obtained, the minimum operating voltage of the chip is compensated for according to the aging compensation voltage, so as to adjust, according to the minimum operating voltage of the chip, a supply voltage of a PMIC that supplies power to the chip, so that the operating voltage of the chip is the supply voltage supplied by the PMIC to the chip after the adjustment, thereby implementing adjustment on the operating voltage of the chip at the first voltage adjustment time point. This ensures that the operating voltage of the chip is not lower than the minimum operating voltage after compensation.

The compensating for the minimum operating voltage of the chip according to the aging compensation voltage so as to adjust the operating voltage of the chip may be specifically implemented by using the following two implementations:

In a first practical implementation, a voltage adjustment request is sent to the PMIC, where the voltage adjustment request includes the aging compensation voltage, so that the PMIC adjusts the operating voltage of the chip according to a voltage sum of the supply voltage currently supplied to the chip and the aging compensation voltage. That is, the chip, upon obtaining the aging compensation voltage corresponding to the first voltage adjustment time point, carries the aging compensation voltage in the voltage adjustment request and sends the voltage adjustment request to the PMIC, so that the PMIC further adds the aging compensation voltage on the basis of the supply voltage currently supplied to the chip as the minimum operating voltage of the chip. Therefore, the PMIC, upon receiving the voltage adjustment request sent by the chip, obtains the aging compensation voltage in the voltage adjustment request; uses a sum of the supply voltage currently supplied to the chip and the aging compensation voltage obtained from the voltage adjustment request as the minimum operating voltage of the chip after compensation; and then adjusts the supply voltage of the chip according to the minimum operating voltage of the chip, so as to ensure that the operating voltage of the chip is not lower than the minimum operating voltage of the chip after compensation.

In a second practical implementation, a voltage adjustment request is sent to the PMIC, where the voltage adjustment request includes a voltage sum of the current operating voltage of the chip and the aging compensation voltage, so that the PMIC adjusts the operating voltage of the chip according to the voltage sum. That is, the chip, upon obtaining the aging compensation voltage at the voltage adjustment time point, carries the sum of the current operating voltage of the chip and the aging compensation voltage in the voltage adjustment request, and sends the voltage adjustment request to the PMIC, so that the PMIC adjusts the supply voltage to be not lower than the sum of the current operating voltage of the chip and the aging compensation voltage. Therefore, the PMIC, upon receiving the voltage adjustment request sent by the chip, obtains the sum of the current operating voltage of the chip and the aging compensation voltage in the voltage adjustment request, uses the sum of the current operating voltage of the chip and the aging compensation voltage as the minimum operating voltage of the chip after compensation, and then adjusts the supply voltage supplied to the chip to be not lower than the minimum operating voltage of the chip after compensation.

Perform step 203 to step 205 repeatedly so that the chip can obtain the operating voltage and/or the operating temperature of the chip at each voltage adjustment time point in the mapping relationship within the life cycle of the chip, determine the aging compensation voltage according to the operating voltage and/or operating temperature of the chip at each voltage adjustment time point, and then compensate for the minimum operating voltage of the chip, so as to compensate for the minimum operating voltage of the chip according to the state parameter of the chip multiple time points within the life cycle of the chip, improve the accuracy for compensating for the minimum operating voltage of the chip, and adjust the operating voltage of the chip according to the minimum operating voltage after compensation.

It should be noted that in step 201, the multiple voltage adjustment time points are divided by using a decreasing time interval between every two neighboring voltage adjustment time points. That is, more voltage adjustment time points may be set in a first stage of the life cycle of the chip than those in a second stage. That is, in the first stage of the life cycle of the chip, the aging speed of the chip is low, and therefore a long time interval may be set between the voltage adjustment time points; and in the second stage of the life cycle of the chip, as the operation time of the chip increases, the aging speed of the chip increases, and a small time interval may be set between the voltage adjustment time points. As a result, this setting mode of the voltage adjustment time points allows a small aging compensation voltage to be obtained during most part of the life cycle of the chip, so that when the minimum operating voltage of the chip is compensated for, the minimum operating voltage of the chip may be retained at a small value, and correspondingly, the operating voltage of the chip may be adjusted at a small value, so as to effectively reduce the aging speed of the chip and the power consumption of the chip, and further increase applicability of the AVS technology.

In the adaptive voltage scaling method according to the second embodiment of the present invention, multiple voltage adjustment time points are divided according to the life cycle of the chip; the aging effect-related state parameter in the chip is obtained at the first voltage adjustment time point; the storage medium is queried according to the state parameter, where the storage medium stores the mapping relationship, which is obtained by aging simulation, between the multiple voltage adjustment time points and the respective state parameter and aging compensation voltage at each voltage adjustment time point, so as to obtain the aging compensation voltage corresponding to the first voltage adjustment time point; and finally, the minimum operating voltage of the chip is compensated for according to the aging compensation voltage, so as to adjust the operating voltage of the chip. Because multiple voltage adjustment time points are set within the life cycle of the chip, and the accurate aging compensation voltage is obtained according to the state parameter of the chip at each voltage adjustment time point, the minimum operating voltage of the chip may be accurately compensated for multiple times within the life cycle of the chip, so that the operating voltage of the chip is not lower than the minimum operating voltage after compensation, which solves the problems of aging acceleration and power consumption increase for the chip.

Figure 3:
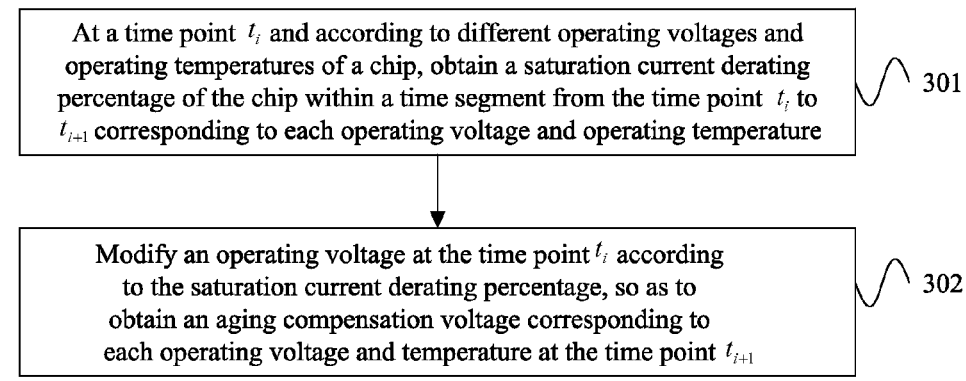
FIG. 3 is a flowchart of a method for determining a mapping relationship in an embodiment illustrated in FIG. 2.

The following describes in detail how to obtain the mapping relationship, which is obtained by aging simulation, between the multiple voltage adjustment time points and the respective state parameter and aging compensation voltage at each voltage adjustment time point. FIG. 3 is a flowchart of a method for determining the mapping relationship in the embodiment illustrated in FIG. 2. As shown in FIG. 3, the method for determining the mapping relationship may include the following steps.

Step 301: At a time point $t_i$ and according to different operating voltages and operating temperatures of a chip, obtain a saturation current degradation percentage of the chip within a time segment from the time point $t_i$ to $t_{i+1}$ corresponding to each operating voltage and operating temperature.

Step 302: modify the operating voltage at the time point $t_i$ according to the saturation current degradation percentage, so as to obtain an aging compensation voltage corresponding to each operating voltage and operating temperature at the time point $t_{i+1}$, where i is an integer greater than or equal to 0. The number of time points is greater than or equal to the number of voltage adjustment time points; the operating voltage of the chip at the time point $t_i$ is a sum of an operating voltage of the chip at a time point $t_{i-1}$ and an aging compensation voltage at the time point $t_i$ corresponding to the operating voltage and operating temperature of the chip at the time point $t_{i-1}$.

In the embodiment, when the operation time of the chip reaches the time point $t_i$, where i is an integer greater than or equal to 0, according to different operating voltages and operating temperatures of the chip, there is definitely a specific difference between the operating voltage and operating temperature of the chip in actual operation and the operating voltage and operating temperature of the chip at the time point $t_i$. As a result, different operating voltages and operating temperatures need to be set for the chip. For example, different operating temperatures set for the chip may be T, T+5° C., T+10° C., and T+15° C. Different operating voltages during initial operation for the chip may be a minimum operating voltage of the chip at a time point $t_0$, the minimum operating voltage of the chip at the time point $t_0+0.05$ V, the minimum operating voltage of the chip at the time point $t_0+0.1$ V, and the minimum operating voltage of the chip at the time point $t_0+0.15$ V. Therefore, each operating voltage of the chip at the time point $t_1$ is the operating voltage of the chip at the time point $t_0$ plus the aging compensation voltage at the time point $t_1$ corresponding to the operating voltage and operating temperature at the time point $t_0$. Similarly, each operating voltage of the chip at the time point $t_i$ is the operating voltage of the chip at the time point $t_{i-1}$ plus the aging compensation voltage at the time point $t_i$ corresponding to the operating voltage and operating temperature at the time point $t_{i-1}$. Therefore, in such cases, there are 16 possibilities of the operating voltage and operating temperature of the chip corresponding to the time point $t_i$, so that the chip can, at the first voltage adjustment time point, find the corresponding operating voltage and operating temperature from the operating voltages and operating temperatures of the chip in the obtained mapping relationship obtained above, which may improve the accuracy for compensating for the minimum operating voltage of the chip. It should be noted that the number and change step of the different operating voltages and temperatures of the chip at the time point $t_i$ are used as an example for description, and the embodiment of the present invention is not limited thereto.

In step 301, a specific implementation process of obtaining the saturation current degradation percentage of the chip within the time segment from the time point $t_i$ to $t_{i+1}$ corresponding to each operating voltage and operating temperature may be:

Step 1: Obtain a drain-source voltage and a gate-source voltage of each MOS transistor of the chip within a simulation duration $\Delta t$ after $t_i$.

In the embodiment, the chip includes many MOS transistors, where a case of saturation current degradation and increase in threshold voltage of each MOS transistor can reflect a case of chip aging. Therefore, at the time $t_i$, the drain-source voltage Vds and the gate-source voltage Vgs of each MOS transistor of the chip within the simulation duration $\Delta t$ after $t_i$ are obtained according to one operating voltage and one operating temperature of the chip, where a length of the simulation duration $\Delta t$ is lower than a length of a time segment between the time points.

Step 2: According to the operating temperature at $t_i$, the drain-source voltage, and a saturation current degradation model of the MOS transistor caused by hot carrier injection HCI, obtain a first saturation current degradation percentage of each MOS transistor within the time segment from $t_i$ to $t_{i+1}$ caused by the HCI.

In the embodiment, the saturation current degradation model of the MOS transistor caused by the hot carrier injection (Hot Carrier Injection, HCI for short) may be represented by a formula 1, where the formula 1 is:

$$mttf_1 = A_1 \times \Delta id\ \%^{1/n_1} \times e^{B \times (1/Vds)} \times e^{Ea_1/(KT)}$$

where $A_1$, $n_1$, and B are coefficients related to the degradation model; $Ea_1$ is activation energy of the HCI (that is, energy required to change a common electron into a hot carrier); K is a Boltzmann constant; $mttf_1$ is a use life of the MOS transistor under the impact of the HCI; T is the operating temperature of the chip at $t_i$; $\Delta id$ % is the saturation current degradation percentage within $mttf_1$; and Vds is the drain-source voltage of the MOS transistor. The saturation current degradation percentage of the MOS transistor within a unit time caused by the HCI may be obtained by using the formula 1, where the saturation current degradation percentage may be represented by a formula 2, and the formula 2 is:

$$\Delta id\ \% = [dt/(A_1 \times e^{B \times (1/Vds)} \times e^{Ea_1/(KT)})]^{n_1}$$

Because Vds of the MOS transistor within the simulation duration $\Delta t$ is obtained, the saturation current degradation percentage of the MOS transistor within the simulation duration $\Delta t$ after the time $t_i$ caused by the HCI may be obtained by using the formula 2, where the saturation current degradation percentage may be represented by a formula 3, and the formula 3 is:

$$\Delta id\ \% = \left[ \int_0^{\Delta t} \frac{dt}{(A_1 \times e^{B \times (1/Vds)} \times e^{Ea_1/(KT)})} \right]^{n_1}$$

In the embodiment, it may be deemed that an aging speed of the chip within the time segment from $t_i$ to $t_{i+1}$ is the same as an aging speed within the simulation duration $\Delta t$. Therefore, the first saturation current degradation percentage of the MOS transistor within the time segment from $t_i$ to $t_{i+1}$ caused by the HCI may be obtained by using the formula 3, where the first saturation current degradation percentage may be represented by a formula 4, and the formula 4 is:

$$\Delta id\ \%_1 = \frac{t_{i+1} - t_i}{\Delta t} \times \left[ \int_0^{\Delta t} \frac{dt}{(A_1 \times e^{B \times (1/Vds)} \times e^{Ea_1/(KT)})} \right]^{n_1}$$

where $\Delta id$ % is the first saturation current degradation percentage of the MOS transistor within the time segment from $t_i$ to $t_{i+1}$ caused by the HCI.

Therefore, the first saturation current degradation percentage of each MOS transistor within the time segment from $t_i$ to $t_{i+1}$ caused by the HCI may be obtained by using the formula 4.

Step 3: According to the operating temperature at $t_i$, the gate-source voltage, and a saturation current degradation model of the MOS transistor caused by bias temperature instability BTI, obtain a second saturation current degradation percentage of each MOS transistor within the time segment from $t_i$ to $t_{i+1}$ caused by the BTI.

In the embodiment, the saturation current degradation model of the MOS transistor caused by the bias temperature instability (Bias Temperature Instability, BTI for short) may be represented by a formula 5, where the formula 5 is:

$$mttf_2 = A_2 \times \Delta id\ \%^{1/n_2} \times e^{\gamma \times (1/Vgs)} \times e^{Ea_2/(KT)}$$

where $A_2$, $n_2$, and $\gamma$ are coefficients related to the degradation model; $Ea_2$ is activation energy of the BTI (that is, energy required to move a cation to move to a gate); K is a Boltzmann constant; $mttf_2$ is a use life of the MOS transistor under the impact of the BTI; T is the operating temperature of the chip at $t_i$; $\Delta id$ % is the saturation current degradation percentage within $mttf_2$; and Vgs is the gate-source voltage of the MOS transistor. The saturation current degradation percentage of the MOS transistor within a unit time caused by the BTI may be obtained by using the formula 5, where the saturation current degradation percentage may be represented by a formula 6, and the formula 6 is:

$$\Delta id\% = [dt/(A_e \times e^{\lambda \times (1/Vgs)} \times e^{Ea2/(KT)})]^{n2}.$$

Because Vgs of the MOS transistor within the simulation duration Δt is obtained, the saturation current degradation percentage of the MOS transistor within the simulation duration Δt after the time $t_i$ caused by the BTI may be obtained by using the formula 6, where the saturation current degradation percentage may be represented by a formula 7, and the formula 7 is:

$$\Delta id\ \% = \left[ \int_0^{\Delta t} \frac{dt}{(A_2 \times e^{\gamma \times (1/Vgs)} \times e^{Ea2/(KT)})} \right]^{n2}$$

In the embodiment, it may be deemed that an aging speed of the chip within the time segment from $t_i$ to $t_{i+1}$ is the same as an aging speed within the simulation duration Δt. Therefore, the second saturation current degradation percentage of the MOS transistor within the time segment from $t_i$ to $t_{i+1}$ caused by the BTI may be obtained by using the formula 7, where the second saturation current degradation percentage may be represented by a formula 8, and the formula 8 is:

$$\Delta id\ \%_2 = \frac{t_{i+1} - t_i}{\Delta t} \times \left[ \int_0^{\Delta t} \frac{dt}{(A_2 \times e^{\gamma \times (1/Vgs)} \times e^{Ea2/(KT)})} \right]^{n2}$$

where $\Delta id\ \%_2$ is the second saturation current degradation percentage of the MOS transistor within the time segment from $t_i$ to $t_{i+1}$ caused by the BTI.

Therefore, the second saturation current degradation percentage of each MOS transistor within the time segment from $t_i$ to $t_{i+1}$ caused by the BTI may be obtained.

Step 4: Determine a sum of the first saturation current degradation percentage and the second saturation current degradation percentage of each MOS transistor within the time segment from $t_i$ to $t_{i+1}$ as the saturation current degradation percentage of each MOS transistor within the time segment from $t_i$ to $t_{i+1}$.

In the embodiment, because the MOS transistor is affected by both the HCI and the BTI, the saturation current degradation percentage of the MOS transistor within the time segment from $t_i$ to $t_{i+1}$ is the sum of the first saturation current degradation percentage of the MOS transistor within the time segment from $t_i$ to $t_{i+1}$ caused by the HCI and the second saturation current degradation percentage of the MOS transistor within the time segment from $t_i$ to $t_{i+1}$ caused by the BTI. Therefore, the saturation current degradation percentage of each MOS transistor within the time segment from $t_i$ to $t_{i+1}$ may be obtained by adding the first saturation current degradation percentage and the second saturation current degradation percentage corresponding to each MOS transistor within the time segment from $t_i$ to $t_{i+1}$.

Further, a specific implementation process of step 302 in the embodiment may be:

Step 1: Obtain a first output frequency of the chip within the simulation duration Δt after $t_i$.

In the embodiment, after the operating voltage and operating temperature of the chip at the time point $t_i$ are determined, the chip operates at the operating voltage and operating temperature within the simulation duration Δt after the time point $t_i$, so as to obtain the first output frequency of the chip within the simulation duration Δt after $t_i$ corresponding to the operating voltage and operating temperature.

Step 2: Obtain a post-aging physical parameter of the chip at $t_{i+1}$ according to the saturation current degradation percentage of each MOS transistor within the time segment from $t_i$ to $t_{i+1}$.

In the embodiment, it may be deemed that each MOS transistor degrades according to their respective saturation current degradation percentage within the time segment from $t_i$ to $t_{i+1}$, so as to calculate and obtain a physical parameter, such as a change step in a threshold voltage of each MOS transistor, of each MOS transistor after degradation according to their respective saturation current degradation percentage. The change step in threshold voltage and the saturation current degradation percentage satisfy a specific function relationship. It should be noted that the saturation current degradation percentage affects the physical parameter of the MOS transistor in the same way as the prior art, which is not described in the embodiment of the present invention. The post-aging physical parameter of the chip at $t_{i+1}$ may be determined according to the post-degradation physical parameter of each MOS transistor.

Step 3: Perform simulation aging processing on the chip by using the post-aging physical parameter.

In the embodiment, simulation aging processing is performed on the chip according to the obtained post-aging physical parameter of the chip at the time point $t_{i+1}$, so that the physical parameter of the chip is the post-aging physical parameter, thereby obtaining the post-aging chip.

Step 4: Enable the post-aging chip to operate at the operating temperature at $t_i$ within the simulation duration Δt, and obtain a second output frequency of the post-aging chip within the simulation duration Δt.

In the embodiment, the post-aging chip is enabled to operate at the operating temperature and voltage at $t_i$ within the simulation duration Δt, so as to obtain the second output frequency of the post-aging chip within the simulation duration Δt. For the purpose of ensuring that performance of the post-aging chip is the same as performance of the chip prior to aging (that is, the chip at the time point $t_i$), the second output frequency of the post-aging chip within the simulation duration Δt may be enabled to be the same as the first output frequency of the chip within the simulation duration Δt. In the embodiment, it may be deemed that a temperature of the chip in the operation process is constant; therefore, the second output frequency may be changed by changing the operating voltage of the post-aging chip.

Step 5: When the second output frequency equals the first output frequency, obtain the operating voltage of the post-aging chip, and determine a difference between the operating voltage of the post-aging chip and the operating voltage at $t_i$ as the aging compensation voltage at $t_{i+1}$.

In the embodiment, when the second output frequency equals the first output frequency, the operating voltage of the post-aging chip after the change is obtained, and a difference between the operating voltage of the post-aging chip and the operating voltage set for the chip at the time point $t_i$ is determined as the aging compensation voltage at the time point $t_{i+1}$. That is, the operating voltage of the chip at the time point $t_{i+1}$ requires that the aging compensation voltage at the time point $t_{i+1}$ is to be added on the basis of the operating voltage at the time point $t_i$, so as to ensure that operation performance of the chip at the time point $t_{i+1}$ is the same as operation performance at the time point $t_i$. This can obtain the aging compensation voltage at $t_{i+1}$ corresponding to the operating voltage and operating temperature at different $t_i$, thereby generating the mapping relationship where the $t_{i+1}$ corresponds to different operating voltages and temperatures, and the different operating voltages and temperatures correspond to different aging compensation voltages.

It should be noted that more time points may be set in a first stage of the life cycle of the chip than those in a second stage. That is, in the first stage of the life cycle of the chip, the aging speed of the chip is low, and therefore a long time interval may be set between the time points; and in the second stage of the life cycle of the chip, as the operation time of the chip increases, the aging speed of the chip increases, and a small time interval may be set between the time points. As a result, this setting mode of the time points allows a small aging compensation voltage to be obtained during most part of the life cycle of the chip, so that the minimum operating voltage of the chip may be retained at a small value. Correspondingly, this can effectively reduce the aging speed of the chip and the power consumption of the chip, and further increase applicability of the AVS technology.

It should be noted that in an actual implementation, the above process of determining the mapping relationship may be implemented by software.

Figure 4:
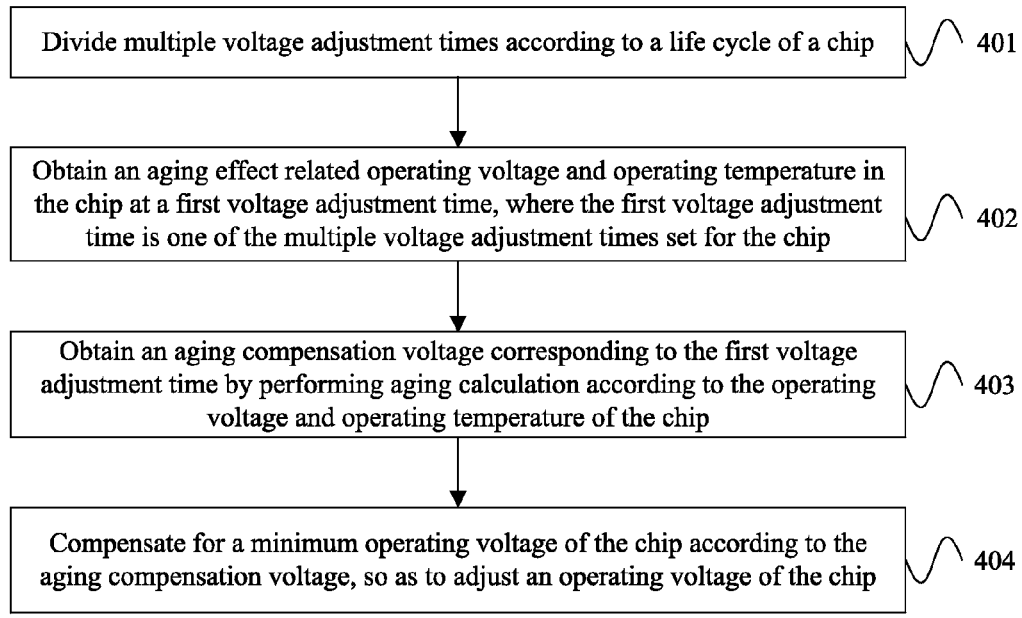
FIG. 4 is a flowchart of an adaptive voltage scaling method according to a third embodiment of the present invention.

FIG. 4 is a flowchart of an adaptive voltage scaling method according to a third embodiment of the present invention. As shown in FIG. 4, the method according to the embodiment may include:

Step 401: Divide multiple voltage adjustment time points according to a life cycle of a chip.

In the embodiment, reference may be made to the related description in step 201 for a detailed process of a specific implementation of dividing the multiple voltage adjustment time points according to the life cycle of the chip, which is not described herein.

Step 402: Obtain an aging effect-related operating voltage and operating temperature in a chip at a first voltage adjustment time point, where the first voltage adjustment time point is one of the multiple voltage adjustment time points set for the chip.

In the embodiment, multiple voltage adjustment time points are set for the chip within the life cycle of the chip, and then operation time of the chip is recorded. Specifically, a counter may be set in the chip, where the counter records the operation time of the chip, and the counter also stores the recorded operation time of the chip to a storage medium (for example, a non-volatile memory), so as to avoid a loss of the recorded operation time of the chip when the chip is powered off. This can improve accuracy for adjusting a minimum operating voltage of the chip.

When the counter records that the operation time of the chip is one adjustment time point of the multiple voltage adjustment time points within the life cycle of the chip, indicating the first voltage adjustment time point is reached, the minimum operating voltage of the chip needs to be compensated for. In such cases, the operating voltage and the operating temperature of the chip should be obtained. Reference may be made to the related description in step 203 for a specific implementation process of obtaining the operating voltage of the chip and obtaining the operating temperature of the chip, which is not described repeatedly herein.

Step 403: Obtain an aging compensation voltage corresponding to the first voltage adjustment time point by performing aging calculation according to the operating voltage and operating temperature of the chip.

In the embodiment, a specific process of obtaining, when the first voltage adjustment time point is reached and by performing aging calculation, a saturation current degradation percentage of the chip within a time segment from the first voltage adjustment time point to a next voltage adjustment time point corresponding to the current operating voltage and operating temperature of the chip may be: obtaining a drain-source voltage and a gate-source voltage of at least one MOS transistor within a simulation duration Δt after the first voltage adjustment time point; according to the operating temperature at the first voltage adjustment time point, the drain-source voltage, and a saturation current degradation model of at least one MOS transistor caused by HCI, obtaining a first saturation current degradation percentage of the at least one MOS transistor from the first voltage adjustment time to the next voltage adjustment time point caused by the HCI; according to the operating temperature at the first voltage adjustment time point, the gate-source voltage, and a saturation current degradation model of the least one MOS transistor caused by BTI, obtaining a second saturation current degradation percentage of each MOS transistor from the first voltage adjustment time point to the next voltage adjustment time point caused by the BTI; determining a sum of the first saturation current degradation percentage and the second saturation current degradation percentage of each MOS transistor within the time segment from the first voltage adjustment time point to the next voltage adjustment time point as a saturation current degradation percentage of each MOS transistor within the time segment from the first voltage adjustment time point to the next voltage adjustment time point; and then determining a maximum value of the saturation current degradation percentages of the MOS transistors as the saturation current degradation percentage of the chip within from the first voltage adjustment time point to the next voltage adjustment time point. Reference may be made to the related description in step 301 for a detailed process of obtaining the saturation current degradation percentage of the MOS transistor, which is not described repeatedly herein.

After the saturation current degradation percentage of the chip from the first voltage adjustment time point to the next voltage adjustment time point corresponding to the current operating voltage and the operating temperature of chip is obtained, the saturation current degradation percentage and a related state parameter are substituted into an aging model, so as to calculate and obtain an aging compensation voltage corresponding to the first voltage adjustment time point, where the aging model may be an existing one. It should be noted that this process may be implemented by using an aging model in the prior art or future art to calculate and obtain the aging compensation voltage corresponding to the voltage adjustment time point, where the present invention sets no limit thereto.

Step 404: Compensate for the minimum operating voltage of the chip according to the aging compensation voltage, so as to adjust the operating voltage of the chip.

In the embodiment, after the aging compensation voltage is obtained, when the next voltage adjustment time point is reached, the minimum operating voltage of the chip is compensated for according to the obtained aging compensation voltage, and then the operating voltage of the chip is adjusted according to the minimum operating voltage after compensation. Reference may be made to the related description in step 205 for a detailed process of a specific implementation of compensating for the minimum operating voltage of the chip according to the aging compensation voltage to adjust the operating voltage of the chip, which is not described repeatedly herein.

Perform step 402 to step 404 repeatedly so that the chip can obtain the operating voltage and the operating temperature of the chip at each voltage adjustment time point within the life cycle of the chip, determine the aging compensation voltage according to the operating voltage and/or operating temperature of the chip at each voltage adjustment time point, and then compensate for the minimum operating voltage of the chip, so as to compensate for the minimum operating voltage of the chip according to the current state parameter of the chip multiple times within the life cycle of the chip, improve the accuracy for compensating for the minimum operating voltage of the chip, and adjust the operating voltage of the chip according to the minimum operating voltage after compensation.

In the adaptive voltage scaling method according to the third embodiment of the preset invention, the multiple voltage adjustment time points are divided according to the life cycle of the chip; the aging effect-related operating voltage and operating temperature in the chip are obtained at the first voltage adjustment time point; the aging compensation voltage corresponding to the first voltage adjustment time point is obtained by performing aging calculation according to the operating voltage and the operating temperature of the chip; and the minimum operating voltage of the chip is compensated for according to the aging compensation voltage, so as to adjust the operating voltage of the chip. Because multiple voltage adjustment time points are set within the life cycle of the chip, and the accurate aging compensation voltage is obtained in real time according to the operating voltage and the operating temperature at each voltage adjustment time point, the minimum operating voltage of the chip from the first voltage adjustment time point to a next voltage adjustment time point may be accurately compensated for multiple time points within the life cycle of the chip, so that the operating voltage of the chip at the next voltage adjustment time point is not lower than the minimum operating voltage after compensation, thereby solving the problems of aging acceleration and power consumption increase for the chip.

Figure 5:
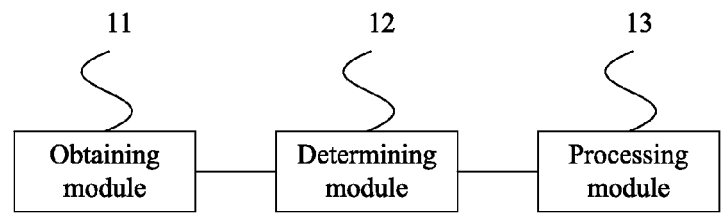
FIG. 5 is a schematic structural diagram of an adaptive voltage scaling chip according to a first embodiment of the present invention.

FIG. 5 is a schematic structural diagram of an adaptive voltage scaling chip according to a first embodiment of the present invention. As shown in FIG. 5, the chip according to the embodiment may include: an obtaining module 11, a determining module 12, and a processing module 13, where the obtaining module 11 is configured to obtain an aging effect-related state parameter in the chip at a first voltage adjustment time point, where the first voltage adjustment time point is one of multiple voltage adjustment time points set for the chip; the determining module 12 is configured to determine an aging compensation voltage corresponding to the first voltage adjustment time point according to the state parameter; and the processing module 13 is configured to compensate for a minimum operating voltage of the chip according to the aging compensation voltage, so as to adjust an operating voltage of the chip.

The adaptive voltage scaling chip according to the embodiment may be configured to implement the technical solution according to the method embodiments of the present invention described above, where the implementation principle and technical effects are similar. Reference may be made to the description of the foregoing embodiments for details, which is not described repeatedly herein.

Figure 6:
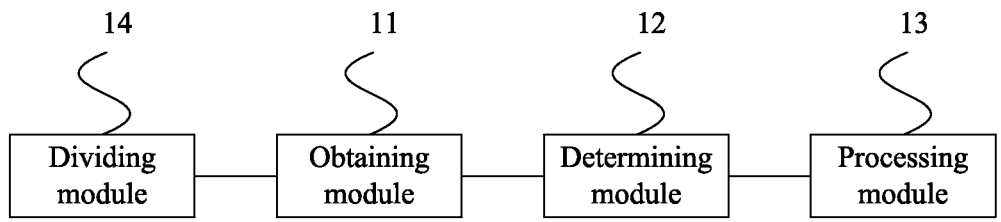
FIG. 6 is a schematic structural diagram of an adaptive voltage scaling chip according to a second embodiment of the present invention.

FIG. 6 is an adaptive voltage scaling chip according to a second embodiment of the present invention. As shown in FIG. 6, on the basis of the chip structure illustrated in FIG. 5, the chip according to the embodiment may further include a dividing module 14, where the dividing module 14 is configured to divide, before the obtaining module 11 obtains the aging effect-related state parameter in the chip at the first voltage adjustment time point, multiple voltage adjustment time points according to the life cycle of the chip.

Further, the dividing module 14 is specifically configured to divide the multiple voltage adjustment time points by using a decreasing time interval between every two neighboring voltage adjustment time points; or divide the multiple voltage adjustment time points by using an equal interval; or divide the multiple voltage adjustment time points according to a slope of an aging effect curve of the chip.

Preferably, the state parameter includes an operating voltage and an operating temperature.

Further, the determining module 12 is specifically configured to query a storage medium according to the state parameter to obtain the aging compensation voltage corresponding to the first voltage adjustment time point, where the storage medium stores a mapping relationship, which is obtained by aging simulation, between the multiple voltage adjustment time points and a respective state parameter and aging compensation voltage at each voltage adjustment time point; or obtain the aging compensation voltage by performing aging calculation according to the state parameter.

Further, the processing module 13 is specifically configured to send a voltage adjustment request to a PMIC, where the voltage adjustment request includes the aging compensation voltage, so that the PMIC adjusts the operating voltage of the chip according to a voltage sum of a supply voltage currently supplied to the chip and the aging compensation voltage; or send a voltage adjustment request to the PMIC, where the voltage adjustment request includes a voltage sum of the current operating voltage of the chip and the aging compensation voltage, so that the PMIC adjusts the operating voltage of the chip according to the voltage sum.

The mapping relationship, which is obtained by aging simulation, between the multiple voltage adjustment time points and the respective state parameter and aging compensation voltage at each voltage adjustment time point is obtained in the following mode:

at a time point $t_i$ and according to different operating voltages and operating temperatures of the chip, obtaining a saturation current degradation percentage of the chip within a time segment from the time point $t_i$ to $t_{i+1}$ corresponding to each operating voltage and operating temperature; and modifying the operating voltage at the time point $t_i$ according to the saturation current degradation percentage, so as to obtain an aging compensation voltage at the time point $t_{i+1}$ corresponding to each operating voltage and operating temperature;

where i is an integer greater than or equal to 0; the number of time points is greater than or equal to the number of voltage adjustment time points; the operating voltage of the chip at the time point $t_i$ is a sum of an operating voltage of the chip at a time point $t_{i-1}$ and an aging compensation voltage at the time point $t_{i-1}$ corresponding to the operating voltage and operating temperature of the chip at the time point $t_i$.

Further, the obtaining the saturation current degradation percentage of the chip within the time segment from the time point $t_i$ to $t_{i+1}$ corresponding to each operating voltage and operating temperature includes:

obtaining a drain-source voltage and a gate-source voltage of each MOS transistor of the chip within a simulation duration $\Delta t$ after $t_i$;

according to the operating temperature at $t_i$, the drain-source voltage, and a saturation current degradation model of the MOS transistor caused by hot carrier injection HCI, obtaining a first saturation current degradation percentage of each MOS transistor within the time segment from $t_i$ to $t_{i+1}$ caused by the HCI;

according to the operating temperature at $t_i$, the gate-source voltage, and a saturation current degradation model of the MOS transistor caused by bias temperature instability BTI, obtaining a second saturation current degradation percentage of each MOS transistor within the time segment from $t_i$ to $t_{i+1}$ caused by the BTI; and determining a sum of the first saturation current degradation percentage and the second saturation current degradation percentage of each MOS transistor within the time segment from $t_i$ to $t_{i+1}$ as the saturation current degradation percentage of each MOS transistor within the time segment from $t_i$ to $t_{i+1}$.

The modifying the operating voltage at the time point $t_i$ according to the saturation current degradation percentage, so as to obtain the aging compensation voltage at the time point $t_{i+1}$ corresponding to each operating voltage and operating temperature includes:

obtaining a first output frequency of the chip within the simulation duration $\Delta t$ after $t_i$;

obtaining a post-aging physical parameter of the chip at $t_{i+1}$ according to the saturation current degradation percentage of each MOS transistor within the time segment from $t_i$ to $t_{i+1}$;

performing simulation aging processing on the chip by using the post-aging physical parameter;

enabling the post-aging chip to operate at the operating temperature at $t_i$ within the simulation duration $\Delta t$, and obtaining a second output frequency of the post-aging chip within the simulation duration $\Delta t$; and when the second output frequency equals the first output frequency, obtaining the operating voltage of the post-aging chip, and determining a difference between the operating voltage of the post-aging chip and the operating voltage at $t_i$ as the aging compensation voltage at $t_{i+1}$.

The adaptive voltage scaling chip according to the embodiment may be configured to implement the technical solution according to the method embodiments of the present invention described above, where the implementation principle and technical effects are similar. Reference may be made to the description of the foregoing embodiments for details, which is not described repeatedly herein.

Figure 7:
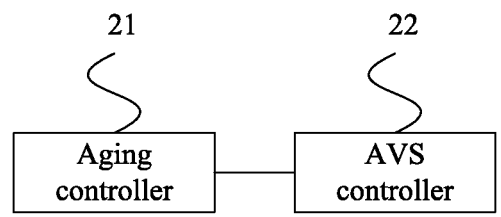
FIG. 7 is a schematic structural diagram of an adaptive voltage scaling chip according to a third embodiment of the present invention.

FIG. 7 is a schematic structural diagram of an adaptive voltage scaling chip according to a third embodiment of the present invention. As shown in FIG. 7, the chip according to the embodiment may include an aging controller 21 and an AVS controller 22, where the aging controller 21 is configured to obtain an aging effect-related state parameter in the chip at a first voltage adjustment time point, where the first voltage adjustment time point is one of multiple voltage adjustment time points set for the chip, and determine an aging compensation voltage corresponding to the first voltage adjustment time point according to the state parameter; and the AVS controller 22 is configured to compensate for a minimum operating voltage of the chip according to the aging compensation voltage, so as to adjust an operating voltage of the chip.

The adaptive voltage scaling chip according to the embodiment may be configured to implement the technical solution according to the method embodiments of the present invention described above, where the implementation principle and technical effects are similar. Reference may be made to the description of the foregoing embodiments for details, which is not described repeatedly herein.

Figure 8:
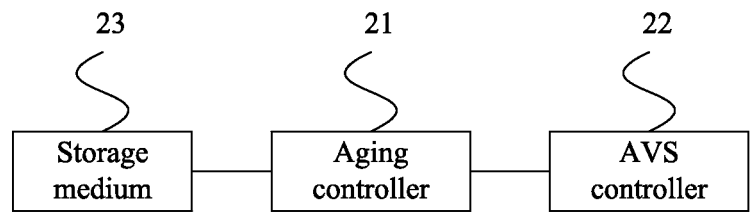
FIG. 8 is a schematic structural diagram of an adaptive voltage scaling chip according to a fourth embodiment of the present invention.

FIG. 8 is an adaptive voltage scaling chip according to a fourth embodiment of the present invention. As shown in FIG. 8, on the basis of the chip structure illustrated in FIG. 7, in the chip according to the embodiment, the aging controller 21 is further configured to divide, before obtaining the aging effect-related state parameter in the chip at the first voltage adjustment time point, the multiple voltage adjustment time points according to the life cycle of the chip.

Further, the aging controller 21 is specifically configured to divide the multiple voltage adjustment time points by using a decreasing time interval between every two neighboring voltage adjustment time points; or divide the multiple voltage adjustment time points by using an equal interval; or divide the multiple voltage adjustment time points according to a slope of an aging effect curve of the chip.

Preferably, the state parameter includes an operating voltage and an operating temperature.

Further, the chip according to the embodiment may further include a storage medium 23, where the storage medium 23 is configured to store a mapping relationship, that is obtained by aging simulation, between the multiple voltage adjustment time points and a respective state parameter and aging compensation voltage at each voltage adjustment time point. The aging controller 21 is specifically configured to query the storage medium 23 according to the state parameter to obtain the aging compensation voltage corresponding to the first voltage adjustment time point, or obtain the aging compensation voltage by performing aging calculation according to the state parameter.

Further, the AVS controller 22 is specifically configured to send a voltage adjustment request to a PMIC, where the voltage adjustment request includes the aging compensation voltage, so that the PMIC adjusts the operating voltage of the chip according to a voltage sum of a supply voltage currently supplied to the chip and the aging compensation voltage; or send a voltage adjustment request to the PMIC, where the voltage adjustment request includes a voltage sum of the current operating voltage of the chip and the aging compensation voltage, so that the PMIC adjusts the operating voltage of the chip according to the voltage sum.

The mapping relationship, which is obtained by aging simulation, between the multiple voltage adjustment time points and the respective state parameter and aging compensation voltage at each voltage adjustment time point is obtained in the following mode:

at a time point $t_i$ and according to different operating voltages and operating temperatures of the chip, obtaining a saturation current degradation percentage of the chip within a time segment from the time point $t_i$ to $t_{i+1}$ corresponding to each operating voltage and operating temperature; and modifying the operating voltage at the time point $t_i$ according to the saturation current degradation percentage, so as to obtain an aging compensation voltage at the time point $t_{i+1}$ corresponding to each operating voltage and operating temperature;

where i is an integer greater than or equal to 0; the number of time points is greater than or equal to the number of voltage adjustment time points; the operating voltage of the chip at the time point $t_i$ is a sum of an operating voltage of the chip at a time point $t_{i-1}$ and an aging compensation voltage at the time point $t_{i-1}$ corresponding to the operating voltage and operating temperature of the chip at the time point $t_i$.

Further, the obtaining the saturation current degradation percentage of the chip within the time segment from the time point $t_i$ to $t_{i+1}$ corresponding to each operating voltage and operating temperature includes:

obtaining a drain-source voltage and a gate-source voltage of each MOS transistor of the chip within a simulation duration $\Delta t$ after $t_i$;

according to the operating temperature at $t_i$, the drain-source voltage, and a saturation current degradation model of the MOS transistor caused by hot carrier injection HCI, obtaining a first saturation current degradation percentage of each MOS transistor within the time segment from $t_i$ to $t_{i+1}$ caused by the HCI;

according to the operating temperature at $t_i$, the gate-source voltage, and a saturation current degradation model of the MOS transistor caused by bias temperature instability BTI, obtaining a second saturation current degradation percentage of each MOS transistor within the time segment from $t_i$ to $t_{i+1}$ caused by the BTI; and determining a sum of the first saturation current degradation percentage and the second saturation current degradation percentage of each MOS transistor within the time segment from $t_i$ to $t_{i+1}$ as the saturation current degradation percentage of each MOS transistor within the time segment from $t_i$ to $t_{i+1}$.

The modifying the operating voltage at the time point $t_i$ according to the saturation current degradation percentage, so as to obtain the aging compensation voltage at the time point $t_{i+1}$ corresponding to each operating voltage and operating temperature includes:

obtaining a first output frequency of the chip within the simulation duration $\Delta t$ after $t_i$;

obtaining a post-aging physical parameter of the chip at $t_{i+1}$ according to the saturation current degradation percentage of each MOS transistor within the time segment from $t_i$ to $t_{i+1}$;

performing simulation aging processing on the chip by using the post-aging physical parameter;

enabling the post-aging chip to operate at the operating temperature at $t_i$ within the simulation duration $\Delta t$, and obtaining a second output frequency of the post-aging chip within the simulation duration $\Delta t$; and when the second output frequency equals the first output frequency, obtaining the operating voltage of the post-aging chip, and determining a difference between the operating voltage of the post-aging chip and the operating voltage at $t_i$ as the aging compensation voltage at $t_{i+1}$.

The adaptive voltage scaling chip according to the embodiment may be configured to implement the technical solution according to the method embodiments of the present invention described above, where the implementation principle and technical effects are similar. Reference may be made to the description of the foregoing embodiments for details, which is not described repeatedly herein.

Figure 9:
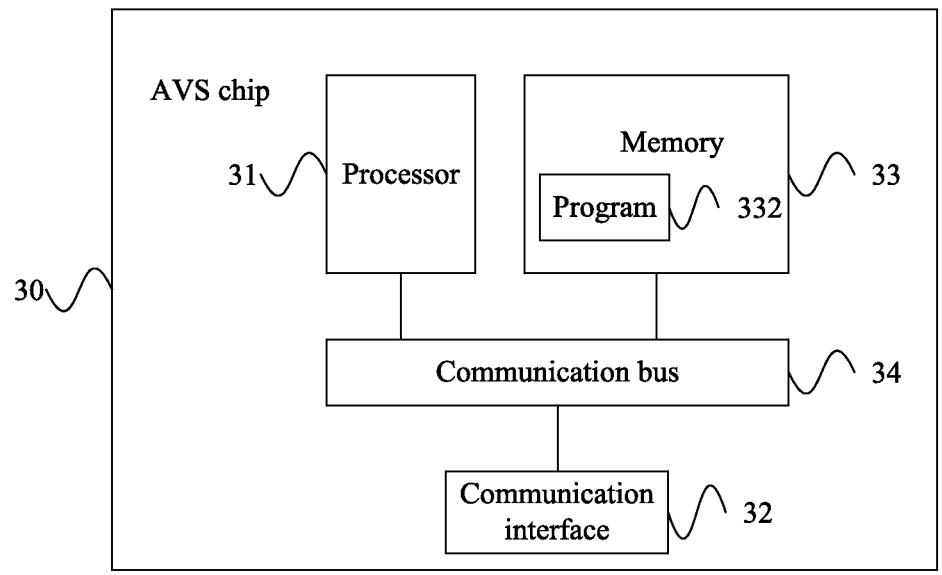
FIG. 9 is a schematic structural diagram of an adaptive voltage scaling chip according to a fifth embodiment of the present invention.

FIG. 9 is a schematic structural diagram of an adaptive voltage scaling chip according to a fifth embodiment of the present invention. As shown in FIG. 9, an AVS chip 30 according to the embodiment may be a chip in a mobile terminal, a chip in a set-top box, a chip in a router, or a chip in a base station device, and the embodiment sets no limit thereto.

The AVS chip 30 according to the embodiment may include a processor (Processor) 31, a communication interface (Communication Interface) 32, a memory (memory) 33, and a communication bus 34, where the processor 31, the communication interface 32, and the memory 33 perform communication between the devices by using the communication bus 34, and the processor 31 further communicates with an external device by using the communication interface 32. The external device may be a PMIC or a processor of the external device, and the like.

The memory 33 is configured to store a program 332. The memory 33 may include a non-volatile memory (non-volatile Memory).

The processor 31 is configured to execute the program 332. Specifically, the program 332 may include program code. The processor 31 may be a central processing unit (Central Processing Unit, CPU for short), or an application-specific integrated circuit (Application Specific Integrated Circuit, ASIC for short), or be configured to be one or more integrated circuits implementing the embodiments the present invention. The processor 31 according to the embodiment can perform the following operations by invoking the program 332:

obtaining an aging effect-related state parameter in a chip at a first voltage adjustment time point, where the first voltage adjustment time point is one of multiple voltage adjustment time points set for the chip; determining an aging compensation voltage corresponding to the first voltage adjustment time point according to the state parameter; and compensating for a minimum operating voltage of the chip according to the aging compensation voltage, so as to adjust an operating voltage of the chip.

Further, before the obtaining the aging effect-related state parameter in the chip at the first voltage adjustment time point, the operation further includes dividing the multiple voltage adjustment time points according to a life cycle of the chip.

Further, the dividing the multiple voltage adjustment time points according to the life cycle of the chip includes: dividing the multiple voltage adjustment time points by using a decreasing time interval between every two neighboring voltage adjustment time points; or dividing the multiple voltage adjustment time points by using an equal interval; or dividing the multiple voltage adjustment time points according to a slope of an aging effect curve of the chip.

Preferably, the state parameter includes an operating voltage and an operating temperature.

Further, the determining the aging compensation voltage corresponding to the first voltage adjustment time point according to the state parameter includes: querying a storage medium according to the state parameter to obtain the aging compensation voltage corresponding to the first voltage adjustment time point, where the storage medium stores a mapping relationship, which is obtained by aging simulation, between the multiple voltage adjustment time points and a respective state parameter and aging compensation voltage at each voltage adjustment time point; or obtaining the aging compensation voltage by performing aging calculation according to the state parameter.

The mapping relationship, which is obtained by aging simulation, between the multiple voltage adjustment time points and the respective state parameter and aging compensation voltage at each voltage adjustment time point is obtained in the following mode:

at a time point $t_i$ and according to different operating voltages and operating temperatures of the chip, obtaining a saturation current degradation percentage of the chip within a time segment from the time point $t_i$ to $t_{i+1}$ corresponding to each operating voltage and operating temperature; and modifying the operating voltage at the time point $t_i$ according to the saturation current degradation percentage, so as to obtain an aging compensation voltage at the time point $t_{i+1}$ corresponding to each operating voltage and operating temperature; where i is an integer greater than or equal to 0; the number of time points is greater than or equal to the number of voltage adjustment time points; the operating voltage of the chip at the time point $t_i$ is a sum of an operating voltage of the chip at a time point $t_{i-1}$ and an aging compensation voltage at the time point $t_{i-1}$ corresponding to the operating voltage and operating temperature of the chip at the time point $t_i$.

Further, the obtaining the saturation current degradation percentage of the chip within the time segment from the time point $t_i$ to $t_{i+1}$ corresponding to each operating voltage and operating temperature includes: obtaining a drain-source voltage and a gate-source voltage of each MOS transistor of the chip within a simulation duration $\Delta t$ after $t_i$; according to the operating temperature at $t_i$, the drain-source voltage, and a saturation current degradation model of the MOS transistor caused by hot carrier injection HCI, obtaining a first saturation current degradation percentage of each MOS transistor within the time segment from $t_i$ to $t_{i+1}$ caused by the HCI; according to the operating temperature at $t_i$, the gate-source voltage, and a saturation current degradation model of the MOS transistor caused by bias temperature instability BTI, obtaining a second saturation current degradation percentage of each MOS transistor within the time segment from $t_i$ to $t_{i+1}$ caused by the BTI; and determining a sum of the first saturation current degradation percentage and the second saturation current degradation percentage of each MOS transistor within the time segment from $t_i$ to $t_{i+1}$ as the saturation current degradation percentage of each MOS transistor within the time segment from $t_i$ to $t_{i+1}$.

The modifying the operating voltage at the time point $t_i$ according to the saturation current degradation percentage, so as to obtain the aging compensation voltage at the time point $t_{i+1}$ corresponding to each operating voltage and operating temperature includes: obtaining a first output frequency of the chip within the simulation duration $\Delta t$ after $t_i$; obtaining a post-aging physical parameter of the chip at $t_i$ according to the saturation current degradation percentage of each MOS transistor within the time segment from $t_{i+1}$ to $t_{i+1}$; performing simulation aging processing on the chip by using the post-aging physical parameter; enabling the post-aging chip to operate at the operating temperature at $t_i$ within the simulation duration $\Delta t$, and obtaining a second output frequency of the post-aging chip within the simulation duration $\Delta t$; and when the second output frequency equals the first output frequency, obtaining the operating voltage of the post-aging chip, and determining a difference between the operating voltage of the post-aging chip and the operating voltage at $t_i$ as the aging compensation voltage at $t_{i+1}$.

Further, the compensating for the minimum operating voltage of the chip according to the aging compensation voltage, so as to adjust an operating voltage of the chip includes: sending a voltage adjustment request to a power manager integrated circuit PMIC, where the voltage adjustment request includes the aging compensation voltage, so that the PMIC adjusts the operating voltage of the chip according to a voltage sum of the supply voltage currently supplied to the chip and the aging compensation voltage; or sending a voltage adjustment request to the PMIC, where the voltage adjustment request includes a voltage sum of the current operating voltage of the chip and the aging compensation voltage, so that the PMIC adjusts the operating voltage of the chip according to the voltage sum.

It should be noted that reference may be made to the method embodiments of the present invention described above for the technical solution specifically implemented by the processor 31 by invoking the program 332, where the implementation principle and technical effects thereof are similar, which is not described repeatedly herein.

Figure 10:
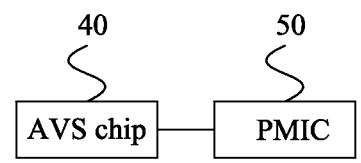
FIG. 10 is a schematic structural diagram of an adaptive voltage scaling system according to a first embodiment of the present invention.

FIG. 10 is a schematic structural diagram of an adaptive voltage scaling system according to a first embodiment of the present invention. As shown in FIG. 10, the system according to the embodiment includes an AVS chip 40 and a PMIC 50, where the AVS chip 40 may uses a structure according to any one AVS chip embodiment illustrated in FIG. 5 to FIG. 8, and can correspondingly implement the technical solution of the method embodiments of the present invention described above, where the implementation principle and technical effects are similar, which is not described repeatedly herein.

Figure 11:
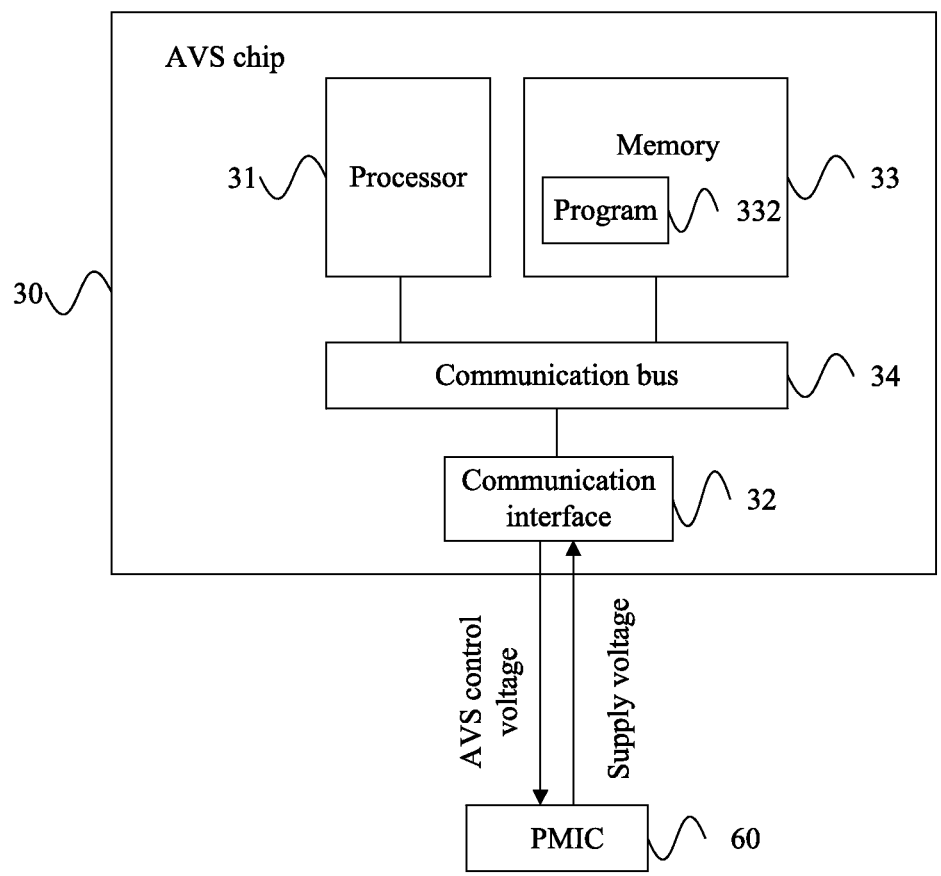
FIG. 11 is a schematic structural diagram of an adaptive voltage scaling system according to a second embodiment of the present invention.

FIG. 11 is a schematic structural diagram of an adaptive voltage scaling system according to a second embodiment of the present invention. As shown in FIG. 11, the AVS system according to the embodiment may include an AVS chip 30 and a PMIC 60, where the AVS chip 30 is the AVS chip 30 illustrated in FIG. 9. For details, reference may be made to the embodiment illustrated in FIG. 9. The AVS chip 30 communicates with the PMIC 60 by using a communication interface 32. The AVS chip 30, when obtaining, at a first voltage adjustment time point, an aging compensation voltage corresponding to the first voltage adjustment time point, sends an AVS control voltage to the PMIC 60, where the AVS control voltage includes the aging compensation voltage. The PMIC 60 receives the AVS control voltage, so as to compensate for a minimum operating voltage of the AVS chip 30, and then adjust, according to the minimum operating voltage after compensation, a supply voltage supplied to the AVS chip 30, thereby enabling the AVS chip 30 to operate at the adjusted supply voltage.

Persons of ordinary skill in the art may understand that all or a part of the steps of the foregoing method embodiments may be implemented by a program instructing relevant hardware. The foregoing program may be stored in a computer readable storage medium. When the program runs, the steps of the foregoing method embodiments are performed. The foregoing storage mediums include various mediums capable of storing program codes, such as an ROM, an RAM, a magnetic disc, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the spirit and scope of the technical solutions of the embodiments of the present invention.

What is claimed is:

1. An adaptive voltage scaling method, comprising:
   obtaining an aging effect-related state parameter in a chip at a first voltage adjustment time point, wherein the first voltage adjustment time point is one of multiple voltage adjustment time points set for the chip;
   determining an aging compensation voltage corresponding to the first voltage adjustment time point according to the state parameter, wherein the aging compensation voltage is determined using a value of a percent degradation in a transistor saturation current within a time segment beginning from the time point; and
   compensating for a minimum operating voltage of the chip according to the aging compensation voltage, so as to adjust an operating voltage of the chip.

2. The method according to claim 1, wherein before obtaining the aging effect-related state parameter, the method further comprises dividing the multiple voltage adjustment time points according to a life cycle of the chip.

3. The method according to claim 2, wherein dividing the multiple voltage adjustment time points according to the life cycle of the chip comprises:
   dividing the multiple voltage adjustment time points by using a decreasing time interval between every two neighboring voltage adjustment time points; or
   dividing the multiple voltage adjustment time points by using an equal interval; or
   dividing the multiple voltage adjustment time points according to a slope of an aging effect curve of the chip.

4. The method according to claim 1, wherein the state parameter comprises an operating voltage and an operating temperature.

5. The method according to claim 4, wherein determining the aging compensation voltage comprises:
querying a storage medium according to the state parameter to obtain the aging compensation voltage corresponding to the first voltage adjustment time point, wherein the storage medium stores a mapping relationship, which is obtained by aging simulation, between the multiple voltage adjustment time points and a respective state parameter and aging compensation voltage at each voltage adjustment time point; or
obtaining the aging compensation voltage by performing and aging calculation according to the state parameter.

6. The method according to claim 5, wherein the mapping relationship is determined as follows:
at a time point $t_i$ and according to different operating voltages and operating temperatures of the chip, obtaining a saturation current degradation percentage of the chip within a time segment from the time point $t_i$ to $t_{i+1}$ corresponding to each operating voltage and operating temperature; and
modifying the operating voltage at the time point $t_i$ according to the saturation current degradation percentage, so as to obtain an aging compensation voltage at the time point $t_{i+1}$ corresponding to each operating voltage and operating temperature;
wherein i is an integer greater than or equal to 0; the number of time points is greater than or equal to the number of voltage adjustment time points; the operating voltage of the chip at the time point $t_i$ is a sum of an operating voltage of the chip at a time point $t_{i-1}$ and an aging compensation voltage at the time point $t_i$ corresponding to the operating voltage and operating temperature of the chip at the time point $t_{i-1}$.

7. The method according to claim 6, wherein obtaining the saturation current degradation percentage of the chip within the time segment from the time point $t_i$ to $t_{i+1}$ corresponding to each operating voltage and operating temperature comprises:
obtaining a drain-source voltage and a gate-source voltage of each MOS transistor of the chip within a simulation duration $\Delta t$ after $t_i$;
according to the operating temperature at $t_i$, the drain-source voltage, and a saturation current degradation model of the MOS transistor caused by hot carrier injection (HCI), obtaining a first saturation current degradation percentage of each MOS transistor within the time segment from $t_i$ to $t_{i+1}$ caused by the HCI;
according to the operating temperature at $t_i$, the gate-source voltage, and a saturation current degradation model of the MOS transistor caused by bias temperature instability (BTI), obtaining a second saturation current degradation percentage of each MOS transistor within the time segment from $t_i$ to $t_{i+1}$ caused by the BTI; and
determining a sum of the first saturation current degradation percentage and the second saturation current degradation percentage of each MOS transistor within the time segment from $t_i$ to $t_{i+1}$ as the saturation current degradation percentage of each MOS transistor within the time segment from $t_i$ to $t_{i+1}$; and
the modifying the operating voltage at the time point $t_i$ according to the saturation current degradation percentage, so as to obtain the aging compensation voltage at the time point $t_{i+1}$ corresponding to each operating voltage and operating temperature comprises:
obtaining a first output frequency of the chip within the simulation duration $\Delta t$ after $t_i$;
obtaining a post-aging physical parameter of the chip at $t_{i+1}$ according to the saturation current degradation percentage of each MOS transistor within the time segment from $t_i$ to $t_{i+1}$;
performing simulation aging processing on the chip by using the post-aging physical parameter;
enabling the post-aging chip to operate at the operating temperature at $t_i$ within the simulation duration $\Delta t$, and obtaining a second output frequency of the post-aging chip within the simulation duration $\Delta t$; and
when the second output frequency equals the first output frequency, obtaining the operating voltage of the post-aging chip, and determining a difference between the operating voltage of the post-aging chip and the operating voltage at $t_i$ as the aging compensation voltage at $t_{i+1}$.

8. The method according to claim 1, wherein compensating for the minimum operating voltage of the chip comprises:
sending a voltage adjustment request to a power manager integrated circuit (PMIC), wherein the voltage adjustment request comprises the aging compensation voltage, so that the PMIC adjusts the operating voltage of the chip according to a voltage sum of a supply voltage currently supplied to the chip and the aging compensation voltage; or
sending a voltage adjustment request to the PMIC, wherein the voltage adjustment request comprises a voltage sum of a current operating voltage of the chip and the aging compensation voltage, so that the PMIC adjusts the operating voltage of the chip according to the voltage sum.

9. The method according to claim 1, wherein determining the aging compensation voltage comprises:
at the first voltage adjustment time point, obtaining the aging compensation voltage corresponding to the operating voltage and an operating temperature of the chip at a time point preceding the first voltage adjustment time point.

10. The method according to claim 9, wherein compensating for a minimum operating voltage of the chip according to the aging compensation voltage comprises:
setting the operating voltage to a sum of the obtained aging compensation voltage at the first voltage adjustment time point and the operating voltage during the time point preceding the first voltage adjustment time point.

11. An adaptive voltage scaling chip, comprising:
an aging controller, configured to obtain an aging effect-related state parameter in the chip at a first voltage adjustment time point, wherein the first voltage adjustment time point is one of multiple voltage adjustment time points set for the chip, the aging controller further configured to determine an aging compensation voltage corresponding to the first voltage adjustment time point according to the state parameter, wherein the aging compensation voltage is determined by the aging controller using a value of a percent degradation in a transistor saturation current within a time segment beginning from the time point; and
an adaptive voltage scaling controller, configured to compensate for a minimum operating voltage of the chip according to the aging compensation voltage, so as to adjust an operating voltage of the chip.

12. The chip according to claim 11, wherein the aging controller is further configured to divide, before obtaining the aging effect-related state parameter in the chip at the first voltage adjustment time point, the multiple voltage adjustment time points according to a life cycle of the chip.

13. The chip according to claim 12, wherein the aging controller is specifically configured to divide the multiple voltage adjustment time points by using a decreasing time interval between every two neighboring voltage adjustment time points; or to divide the multiple voltage adjustment time points by using an equal interval; or to divide the multiple voltage adjustment time points according to a slope of an aging effect curve of the chip.

14. The chip according to claim 11, wherein the state parameter comprises an operating voltage and an operating temperature.

15. The chip according to claim 14, wherein the chip further include a storage medium, which is configured to store a mapping relationship, which is obtained by aging simulation, between the multiple voltage adjustment time points and a respective state parameter and aging compensation voltage at each voltage adjustment time point; and wherein the aging controller is specifically configured to query the storage medium according to the state parameter to obtain the aging compensation voltage corresponding to the first voltage adjustment time point.

16. The chip according to claim 15, wherein the mapping relationship is obtained as follows:

at a time point $t_i$ and according to different operating voltages and operating temperatures of the chip, obtaining a saturation current degradation percentage of the chip within a time segment from the time point $t_i$ to $t_{i+1}$ corresponding to each operating voltage and operating temperature; and modifying the operating voltage at the time point $t_i$ according to the saturation current degradation percentage, so as to obtain an aging compensation voltage at the time point $t_{i+1}$ corresponding to each operating voltage and operating temperature;

where i is an integer greater than or equal to 0; the number of time points is greater than or equal to the number of voltage adjustment time points; the operating voltage of the chip at the time point $t_i$ is a sum of an operating voltage of the chip at a time point $t_{i-1}$ and an aging compensation voltage at the time point $t_{i-1}$ corresponding to the operating voltage and operating temperature of the chip at the time point $t_i$.

17. The chip according to claim 16, wherein the obtaining the saturation current degradation percentage of the chip within the time segment from the time point $t_i$ to $t_{i+1}$ corresponding to each operating voltage and operating temperature includes:

obtaining a drain-source voltage and a gate-source voltage of each MOS transistor of the chip within a simulation duration $\Delta t$ after $t_i$;

according to the operating temperature at $t_i$, the drain-source voltage, and a saturation current degradation model of the MOS transistor caused by hot carrier injection (HCI), obtaining a first saturation current degradation percentage of each MOS transistor within the time segment from $t_i$ to $t_{i+1}$ caused by the HCI;

according to the operating temperature at $t_i$, the gate-source voltage, and a saturation current degradation model of the MOS transistor caused by bias temperature instability (BTI), obtaining a second saturation current degradation percentage of each MOS transistor within the time segment from $t_i$ to $t_{i+1}$ caused by the BTI; and determining a sum of the first saturation current degradation percentage and the second saturation current degradation percentage of each MOS transistor within the time segment from $t_i$ to $t_{i+1}$ as the saturation current degradation percentage of each MOS transistor within the time segment from $t_i$ to $t_{i+1}$.

18. The chip according to claim 14, wherein the aging controller is configured to obtain the aging compensation voltage by performing aging calculation according to the state parameter.

19. The chip according to claim 11, wherein the adaptive voltage scaling controller is configured to send a voltage adjustment request to a PMIC, wherein the voltage adjustment request includes the aging compensation voltage, so that the PMIC adjusts the operating voltage of the chip according to a voltage sum of a supply voltage currently supplied to the chip and the aging compensation voltage; or to send a voltage adjustment request to the PMIC, wherein the voltage adjustment request includes a voltage sum of a current operating voltage of the chip and the aging compensation voltage, so that the PMIC adjusts the operating voltage of the chip according to the voltage sum.

20. An adaptive voltage scaling system, comprising an adaptive voltage scaling chip and a power manager integrated circuit (PMIC), wherein the adaptive voltage scaling chip comprising:

an aging controller, configured to obtain an aging effect-related state parameter in the chip at a first voltage adjustment time point, wherein the first voltage adjustment time point is one of multiple voltage adjustment time points set for the chip, wherein the aging controller is further configured to determine an aging compensation voltage corresponding to the first voltage adjustment time point according to the state parameter, and wherein the aging compensation voltage is determined by the aging controller using a value of a percent degradation in a transistor saturation current within a time segment beginning from the time point; and an adaptive voltage scaling controller, configured to send a voltage adjustment request to the PMIC, wherein the voltage adjustment request includes the aging compensation voltage, so that the PMIC adjusts the operating voltage of the chip according to a voltage sum of a supply voltage currently supplied to the chip and the aging compensation voltage; or to send a voltage adjustment request to the PMIC, where the voltage adjustment request includes a voltage sum of the current operating voltage of the chip and the aging compensation voltage, so that the PMIC adjusts the operating voltage of the chip according to the voltage sum.

21. The system according to claim 20, wherein the aging controller is further configured to divide the multiple voltage adjustment time points by using a decreasing time interval between every two neighboring voltage adjustment time points; or to divide the multiple voltage adjustment time points by using an equal interval; or to divide the multiple voltage adjustment time points according to a slope of an aging effect curve of the chip.

22. The system according to claim 20, wherein the state parameter comprises an operating voltage and an operating temperature.

* * * * *